United States Patent
Marks (10) Patent No.: US 7,686,692 B2
(45) Date of Patent: Mar. 30, 2010

(54) PATTERN CODES USED FOR INTERACTIVE CONTROL OF COMPUTER APPLICATIONS AND VIDEO GAME APPLICATIONS

(75) Inventor: Richard L. Marks, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 1096 days.

(21) Appl. No.: 10/842,932

(22) Filed: May 10, 2004

(65) Prior Publication Data
US 2005/0272502 A1 Dec. 8, 2005

(51) Int. Cl.
A63F 9/24 (2006.01)
A63F 13/00 (2006.01)
G06F 17/00 (2006.01)
G06F 19/00 (2006.01)
G09G 5/00 (2006.01)

(52) U.S. Cl. .................... 463/36; 463/1; 463/4; 463/5; 463/30; 463/31; 463/32; 463/33; 463/47; 345/156

(58) Field of Classification Search .................... 463/1, 463/4, 47, 5, 30–36; 345/156
See application file for complete search history.

(56) References Cited

U.S. PATENT DOCUMENTS

| 4,263,504 A * | 4/1981 | Thomas ....................... 235/454 |
| 4,823,001 A * | 4/1989 | Kobayashi et al. .......... 356/616 |
| 5,260,556 A * | 11/1993 | Lake et al. ................... 235/494 |
| 5,638,228 A | 6/1997 | Thomas, III .................. 360/60 |
| 5,818,424 A * | 10/1998 | Korth .......................... 345/158 |
| 7,042,440 B2 * | 5/2006 | Pryor et al. .................. 345/158 |
| 2002/0016816 A1 | 2/2002 | Rhoads ........................ 709/203 |
| 2004/0046736 A1 | 3/2004 | Pryor et al. .................. 345/156 |
| 2005/0037844 A1 * | 2/2005 | Shum et al. ................... 463/36 |

FOREIGN PATENT DOCUMENTS

| EP | GB 2 206 716 A | | 1/1989 |
| EP | GB 2 398 691 A | | 8/2004 |
| GB | 2206716 A | * | 1/1989 |
| WO | WO 2004/041379 A2 | | 5/2004 |

* cited by examiner

Primary Examiner—John M Hotaling, II
Assistant Examiner—Adetokunbo Torimiro
(74) Attorney, Agent, or Firm—Martine Penilla & Gencarella, LLP (57) ABSTRACT

A method, a system and an article of manufacture are provided to generally enable computer interactivity for any type of application. The method is also capable of providing interacting functionality with a computer game. The method includes presenting a pattern code defined by at least two tags. Applying a light toward the pattern code at a specific time. Then, the method moves to capturing a first video frame of the pattern code before the light is applied to the pattern code, such that the first video frame defines a first characteristic of the pattern code. A second video frame is then captured for the pattern code when the light is applied to the pattern code, such that the second video frame defines a second characteristic of the pattern code. The method then enables decoding of the first characteristic and the second characteristic of the pattern code to produce decoded information.

17 Claims, 8 Drawing Sheets

| Light Application Status | On | On | OFF | ON | OFF | |
|---|---|---|---|---|---|---|
| Detected Pattern code | B | B | A | B | A | |
| Captured Frame | frame n-3 | frame n-2 | frame n-1 | frame n | frame n+1 | |

*Fig. 4A*

| Color Light | Yes | No | No | Yes | No | |
|---|---|---|---|---|---|---|
| Light Application Status | On | On | Off | On | Off | |
| Detected Pattern code | <u>B'</u> | B | A | <u>B'</u> | A | |
| Captured Frame | frame n-3 | frame n-2 | frame n-1 | frame n | frame n+1 | |

PATTERN CODES USED FOR INTERACTIVE CONTROL OF COMPUTER APPLICATIONS AND VIDEO GAME APPLICATIONS

BACKGROUND OF THE INVENTION

1. Field of the Invention

This invention relates generally to computer video games, and more particularly to pattern codes which can produce different patterns depending on when light is applied thereto, and can be decoded to enable interaction with game play.

2. Description of the Related Art

The video game industry has seen many changes over the years. As computing power has expanded over recent years, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation or Sony Playstation2 (PS2), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet.

As game complexity continues to intrigue players, game and hardware manufacturers have continued to innovate to enable additional interactivity. In reality, however, the way in which users interact with a game has not changed dramatically over the years.

In view of the foregoing, there is a need for methods and systems that enable more advanced user interactivity with game play.

SUMMARY OF THE INVENTION

Broadly speaking, the present invention fills these needs by providing a pattern code that can define different pattern configurations depending on whether light is applied to the pattern code. The pattern code configurations are then capable of being captured by a video capture device, decoded, and depending on the decoded code a specific response is made by a video game. The response can be in any form, such as a command, an initiation of action, a selection, a change in game status or state, the unlocking of features, etc.

In one embodiment, an article of manufacture is disclosed. The article of manufacture is defined by a pattern code including at least two tags. Each tag has a first state that is visible when ambient light contacts a surface of each of the two tags, and each tag is capable of having a light reflective surface. The light reflective surface is illuminated when a light that is capable of being directed toward the surface of each of the two tags is present. The light reflective surface of the tag has a second state. The pattern code has a first characteristic when the ambient light is present and a second characteristic when the light is directed toward the surface of each of the two tags.

In another embodiment, a method for interacting with a computer game is disclosed. The method includes presenting a pattern code defined by at least two tags. Applying a light toward the pattern code at a specific time. Then, the method moves to capturing a first video frame of the pattern code before the light is applied to the pattern code, such that the first video frame defines a first characteristic of the pattern code. A second video frame is then captured for the pattern code when the light is applied to the pattern code, such that the second video frame defines a second characteristic of the pattern code. The method then enables decoding of the first characteristic and the second characteristic of the pattern code to produce decoded information. Based on the decoded information, an interactive command is initiated in the computer game, and the type of interactive command is defined by the decoded information that was defined for the computer game.

In still another embodiment, a system for interfacing with a computer game is disclosed. The system includes the use of a pattern code. The system is further defined by a light application device, a video capture device, and a processor. The processor is capable of executing game instructions, executing control instructions for interfacing with the light application device, and executing instructions for capturing video from the video capture device. The light application device is configured to apply light at the pattern code and the execution of the control instructions for the light application device determining when to apply the light. The light being applied at the pattern code to define a first pattern configuration when light is applied and a second pattern configuration when the light is not applied. The execution of the instructions for capturing video is capable of identifying the first pattern configuration and the second pattern configuration to enable the processor to decode the first pattern configuration and the second pattern configuration to define an interactive instruction for the computer game.

A system for interfacing with a program of a computer system is provided. Included is a pattern code, a light application device, a video capture device, and a processor. The processor is capable of executing instructions, executing control instructions for interfacing with the light application device, and executing instructions for capturing video from the video capture device. The light application device is configured to apply light at the pattern code and the execution of the control instructions for the light application device is to determine when to apply the light. The light is applied at the pattern code defining a first pattern configuration when light is applied and a second pattern configuration when the light is not applied. The execution of the instructions for capturing video is capable of identifying the first pattern configuration and the second pattern configuration to enable the processor to decode the first pattern configuration and the second pattern configuration to define an instruction for the program of the computer system.

In general, the interactive detection of pattern codes is applicable to the interfacing with any computer program of a any computing device. Thus, any type of code can be embedded in the pattern codes to drive, direct, or instruct action by code executed on a device that is configured to do the detection and processing. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION OF THE PREFERRED EMBODIMENTS

An invention is disclosed for a pattern code. The pattern code may be in the form of an article of manufacture. The invention further defines a method for using the pattern code with a system that implements the method. The pattern code is defined by one or more tags. Each tag defines part of the pattern code. Depending on the resulting desired pattern code, each tag can be made from a material that can reflect or illuminate when light is applied to the material. Thus, each tag of the pattern code can potentially have two visible states. One state when light is not applied to the tag of the pattern code and one state when light is applied to the tag of the pattern code. The pattern code will thus have one or more of these tags. The pattern code is designed to be placed in front of a light, and the times of when the light is ON or OFF is controlled. At particular times, therefore, the light will be ON or OFF, and the resulting pattern code will take on a visual characteristic to define a code state for the pattern code.

The visible characteristics are preferably discernable enough so that a video capture device can determine differences in the individual tags, and can capture the state of each tag when light is applied to the tag and when light is not applied to the tag of the pattern code. When light is not applied (OFF), there will preferably be some ambient light, such some amount of room lighting typically used during game play. Once the pattern code is captured at the particular times of when the light is ON or OFF, the pattern code can be decoded. Decoding the pattern code will dictate to a game what capabilities are enabled for game play. Thus, the pattern code can be designed such that different combinations of tags that make up the pattern codes will dictate different capabilities or functionality for interactive game play.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to obscure the present invention.

Figure 1A:
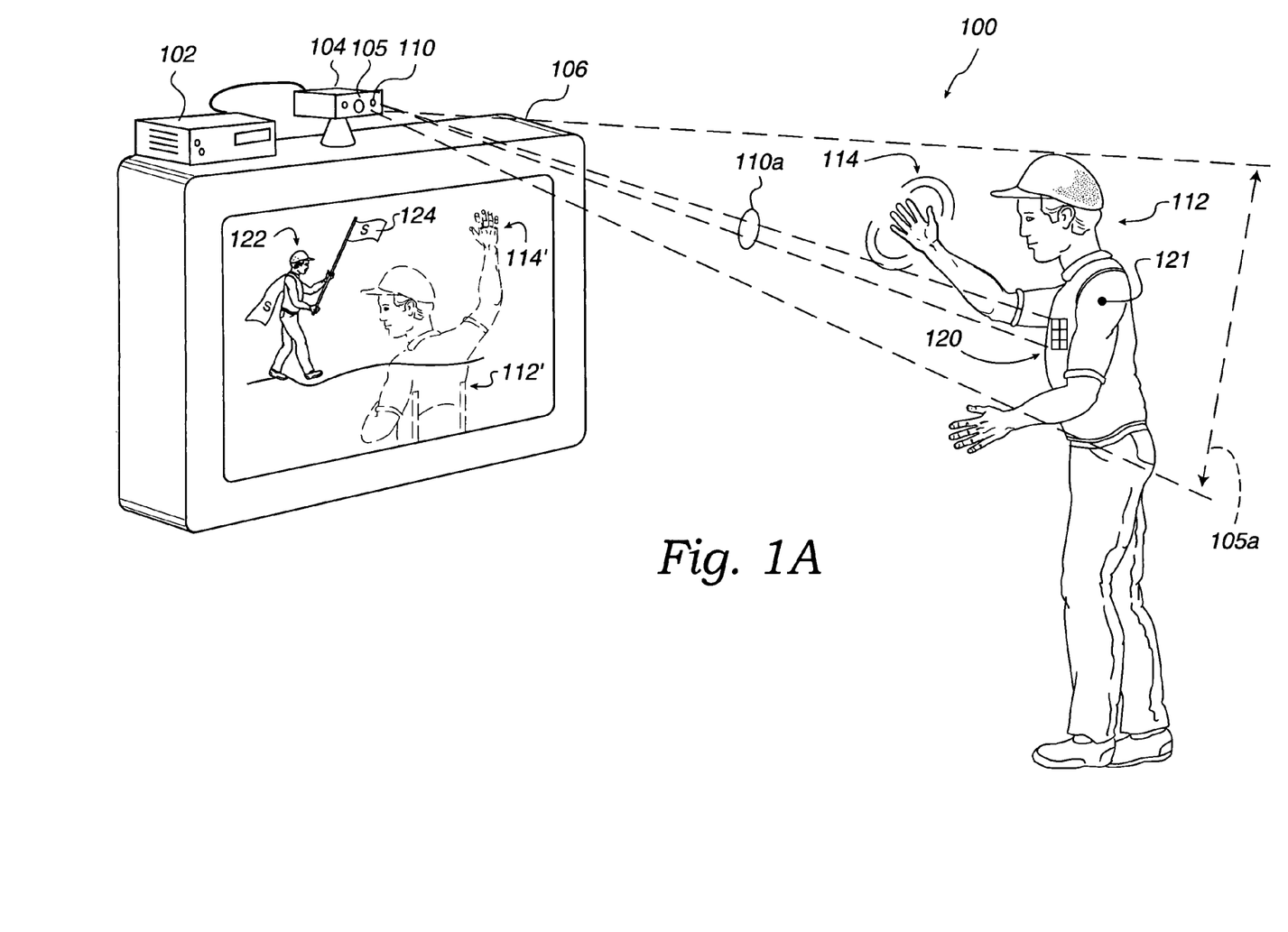
FIG. 1A shows a diagram of a game interface system implementing a pattern code, in accordance with one embodiment of the present invention.

Keeping the above overview in mind, FIG. 1A shows a diagram of a game interface system 100 in accordance with one embodiment of the present invention. The game interface system 100 utilizes a computing system 102 that couples to a housing 104. The housing includes a video capture device 105 and a light application device 110. In an alternative embodiment, each device can be separately provided in its own individual housing.

The video capture device 105 may be a video capturing device that enables frames of images in capture space 105a to be captured and digitized before being transferred to the computing system 102. An example of the video capture device 105 may be a web cam type video capture device that captures images and digitizes them into a number of frames as they are transferred to the computing system 102. In another embodiment, the video capture device 105 may be an analog-type video capture device that continuously captures raw video and then transfers it to the computing system 102. In the computing system 102, the raw video could then be digitized into frames.

The light application device 110 is preferably a light-emitting device that can emit different types of light. The light can be in the form of a colored light, such as those produced by light-emitting diodes (LEDs). As is well known, LEDs are capable of producing a bright enough light that could illuminate objects sitting or placed in front of the LED. An example distance for the object, having the pattern code, to be in front of the applied light may be as close as 1 cm and as far as 20 meters. A more normal middle distance range may be between 50 cm and about 5 meters. In a specific example, the light application device 110 will emit a red light when activated. In another example, the light can take on any color, or can simply be non-colored to the naked eye (e.g., such as the light produced by a flash light).

As shown, the housing 104 for the video capture device 105 and the light application device 110 may sit on top of a display 106. The housing 104 is shown coupled by a wire to the computing system 102. The computing system 102 may be any computer device (i.e., having a processor and memory) that is capable of executing code and interfacing with the video capture device 105 and the light application device 110. The computing system 102 may be local to the housing 104 or can be remotely coupled to another computing device over a network. In a specific example, the computing system 102 may be a game console such as the Sony Playstation 2. The computing system 102 would then be capable of playing a game that allows a player 112 to interface with graphics of the game.

For a more detailed description of a technique for interfacing with a game by detecting movement of a player, reference may be made to United Kingdom Applications GB 0304024.3 (PCT/GB2004/000693) and GB 0304022.7 (PCT/GB2004/000703), each filed on Feb. 21, 2003, and each of which is hereby incorporated by reference.

The video capture device 105 is designed to identify movement 114 of the player 112 to enable interaction with features of a game. In the illustrated example, the player 112 is shown as a translucent image 112' on the display 106. The player 112 can then move his hand (or any part of his body or objects held by the player) as shown by movement 114 to cause interaction with objects of the game.

The movement 114 is shown as movement by the translucent image 112' to produce an active region 114'. The active region 114' is the region that was identified to have motion, in response to processing motion differences between frames.

The active region 114' will then cause the object defined as a flag 124 to move. Thus, the player 112 is allowed to interact with the flag 124 held by a game character 122 (or other aspects of the game features or control features).

In accordance with one embodiment, the player 112 is shown wearing a shirt 121 that includes a pattern code 120. The pattern code 120 is defined by one or more tag codes, and each tag code may be able to change state when light is applied to the individual tags that make up the pattern code 120. The pattern code 120 shown in FIG. 1A is illustrated by six individual tags. Each individual tag may be defined by a different type of fabric or material. The material or fabric is designed to be placed on, sewed on, or applied to the shirt 121 at any location, so long as the pattern code 120 is capable of being illuminated by applied light 110a that is emitted by the light application device 110.

The pattern code 120 should also be placed on the player 112 in a location that would be captured and can be identified by the video capture device 105. Accordingly, the pattern code 120 is configured to have an identifiable pattern that can be captured by the video capture device 105, decoded, and understood to be a particular pattern configuration. When the light application device 110 is turned ON, an applied light 110a is capable of being illuminated on the pattern code 120. When the pattern code 120 is illuminated with the applied light 110a, the pattern code 120 will take on a different pattern code characteristic. Thus, the pattern code 120 is designed to have a first pattern code configuration when the light application device 110 is OFF, and second pattern configuration when the light application device 110 is ON. As noted above, when the light is OFF, there will preferably be some ambient light present. The ambient light can be any light that is typically present during game play. Such ambient light may be room light, or can be the light that is given off by the display.

The light application device 110 is designed to be controlled to the ON and OFF position by code that is executed on the computing system 102. As will be described in greater detail below, the computing system will execute code that determines when the light application device 110 will turn ON and OFF. The duration of which the light will be turned ON and OFF is also controllable to enable the video capture device to capture the resulting pattern code characteristic that results when light is applied or not applied to the pattern code 120. The video capture device 105 is thus designed to capture the different visible conditions of the pattern code 120 and decoding logic is executed by the computer system 102, to determine what the pattern code 120 signifies.

In a preferred embodiment, the pattern code 120 is associated with a shirt 121 that is purchased by the player 112 for use with a specific game. When the user purchases shirt 121 with the specific pattern 120 on the shirt, the user may be provided with special powers when playing the video game associated with the shirt 121. For purposes of example, when the player 112 is wearing shirt 121 with pattern code 120, the game would allow the player 112 to have special powers to, for example, turn the game character 122 into Superman.

If the player 112 were not using the shirt 121 with the pattern code 120, the game character 122 would not be Superman, and would not have special powers. In general terms, the pattern code 120 is used by the player 112 to enable a special characteristic of the game when the user is interacting with the game through the video capture device 105, and the light application device 110 is used to enable decoding of what the pattern 120 symbolizes, and would thus enable the player to activate a feature of a video game. In one embodiment, the pattern 120 may be used to "unlock" an aspect of a video game (e.g., a car, a track, etc.), which would otherwise be unavailable to the user. The pattern 120 can take on any number of forms, and in one embodiment, the form can be a wholistic graphic, where part of the graphic is reflective and the other part is not reflective.

Figure 1B:
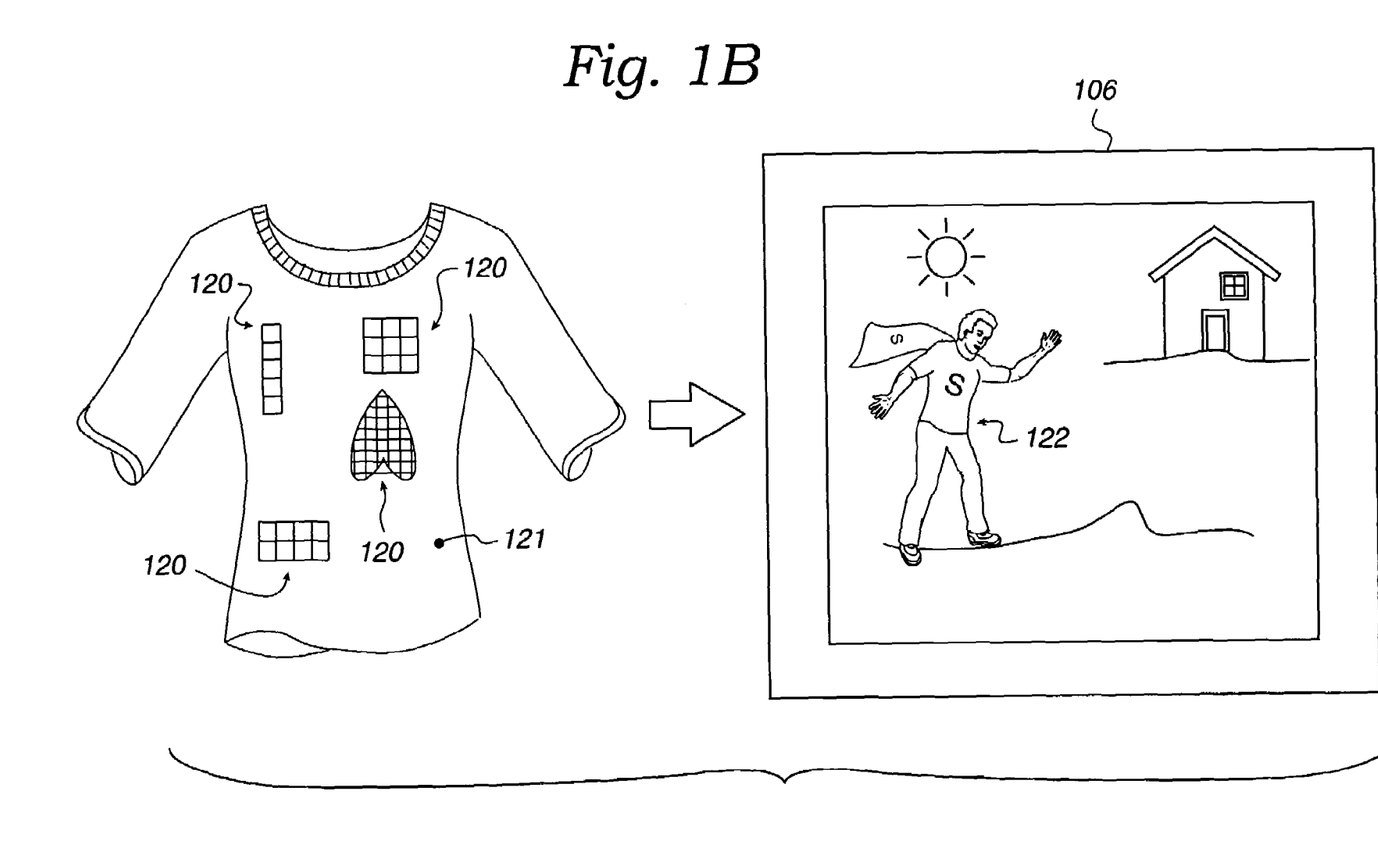
FIG. 1B illustrates an example of a shirt having a number of different pattern codes of different shapes, sizes, colors, and orientations, in accordance with one embodiment of the present invention.

FIG. 1B illustrates an example of the shirt 121 having a number of different pattern codes 120 having different shapes, sizes, and orientations. As mentioned above, each tag piece of the pattern codes 120 would define a particular pattern. Each tag of the pattern code 120 is capable of having two states. The first state would be the identifiable state when no light is being applied to the tag, and a second state when light is being applied to the tag.

Depending on the material, characteristic, or color of the particular tag, the tag will have a particular identifiable state when the light is OFF, and another particular identifiable state when the light is ON and applied to the individual tag. The pattern codes can be sewed onto a shirt 112, for example, or can be stuck on to a shirt to enable the user to interact with a particular game. In another embodiment, the shirt 121 could have the individual tags that make up a pattern code 120 blended into the fabric of the shirt 121. In either case, the individual tags are designed to have two states, one when the light is OFF and not applied against the tag, and one when the light is ON and the light is applied to the tag. If the particular tag is designed to reflect when light is applied to the tag, the reflected light would pose a different pattern to the video capture device 105.

In a like manner, if the light is applied to the particular tag of the pattern code 120 and no reflection occurs, then the video capture device 105 will capture that information and communicate it to the computing system 102. In one embodiment, the pattern codes 120 are designed to have a pattern that is not readily discernible to the naked eye without the use of special lighting. Thus, the pattern that is portrayed to the user by the pattern codes 120 when the light is OFF, will be completely different than the pattern that results when light is applied to the pattern codes 120. In this manner, a user is not able to easily counterfeit the pattern code 120 by simply coloring in a card with different shades of colors that are similar to those that are provided on the shirt 121. This is because when light is applied to the pattern codes 120, the resulting pattern will depend on which individual tags are meant to be reflective. In one example, such reflecting materials are called "retro-reflective".

Referring again to FIG. 1B, the pattern codes 120, once decoded using the ON and OFF states of the applied light 110a, will provide the user interacting with the game special powers, abilities, interface alternatives, or controlling parameters that are not normally available without displaying the pattern codes 120 to the video game being played. In this example, the game character 122 is shown to be Superman, while if the pattern codes 120 represented different information, the game character 122 might resemble a different character or have different powers. It should be understood that the resulting action in the actual game will vary depending on the circumstances of the game and what each particular pattern is meant to do with reference to game play.

Figure 1C:
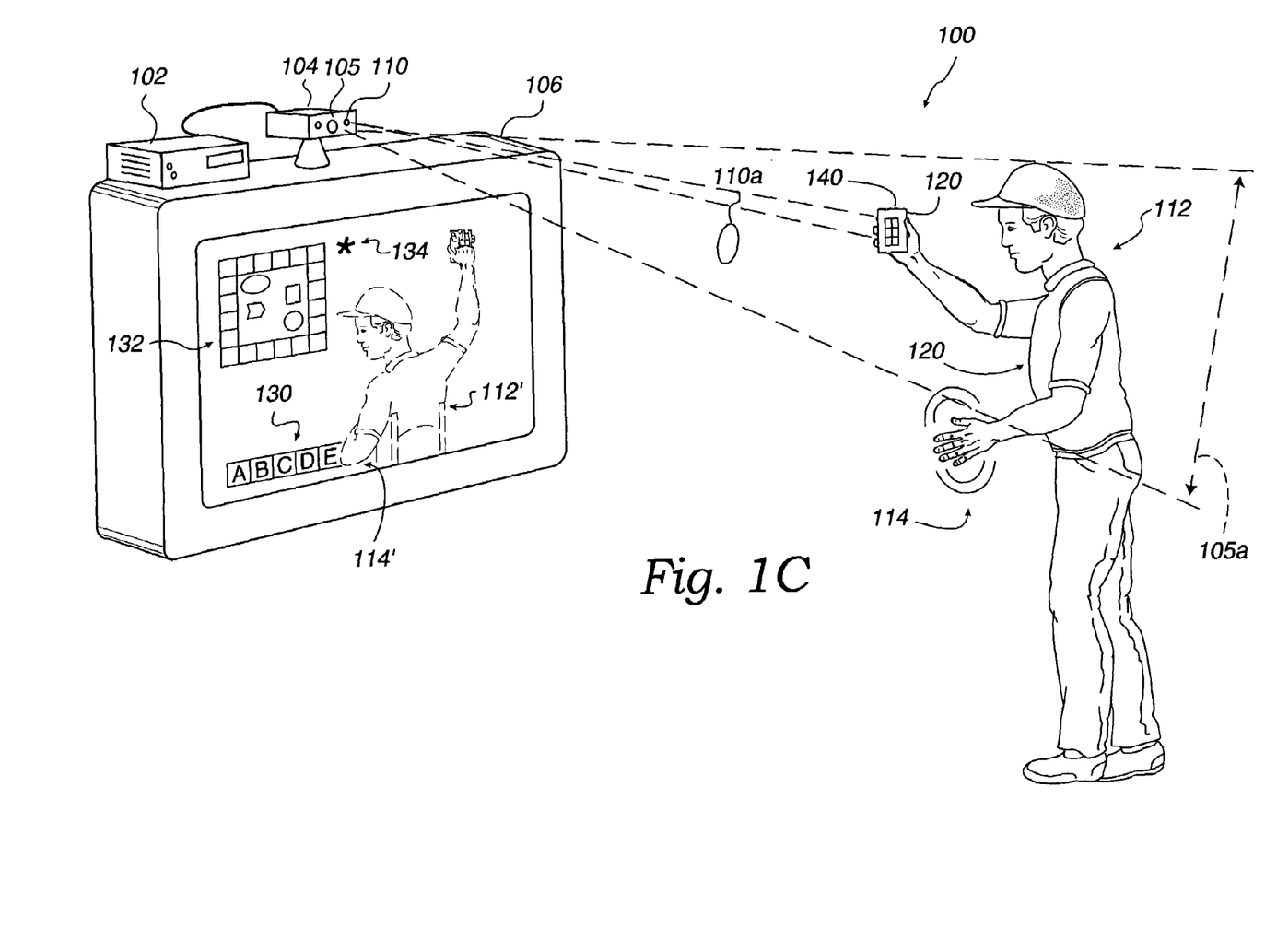
FIG. 1C illustrates an example where the pattern code is placed on a game card, in accordance with one embodiment of the present invention.

FIG. 1C illustrates an example where the pattern code 120 is placed on a game card 140. Instead of wearing the pattern code 120, the pattern code 120 may be provided on a game card 140. A user may then collect or use different game cards 140 to enable different powers or different capabilities for interacting with a game 132. In this example, the user is provided with special powers illustrated by icon 134.

The special powers for playing the game 132 may be illustrated by icon 134 and may provide the user with additional interactive icons 130. The additional interactive icons 130 may not have been provided to the user, but for the fact that the game card 140 was used with the proper pattern code 120. Following this example, the movement 114 of the player 112 can be used to generate an active region 114'. The active region 114' may act to select the interactive icon "E". By selecting the icon "E", the user may cause special interaction with the game 132 that may not have been provided, but for the fact that the user was using game card 140 with the pattern code 120.

As mentioned above; the pattern code 120 is configured to have a pattern distribution with individual tags. Each individual tag may be either reflective or not reflected, and will have a discernible characteristic when the light is applied to the tag and when light is not applied to the tag. By using the pattern code produced by the two situations that when light is applied to the tag and when light is not applied to the tag, the capture device will take in that information in different video frames. The computing system 102 using code operated to detect the different patterns, will compute what abilities are provided by the game card 140.

Figure 2:
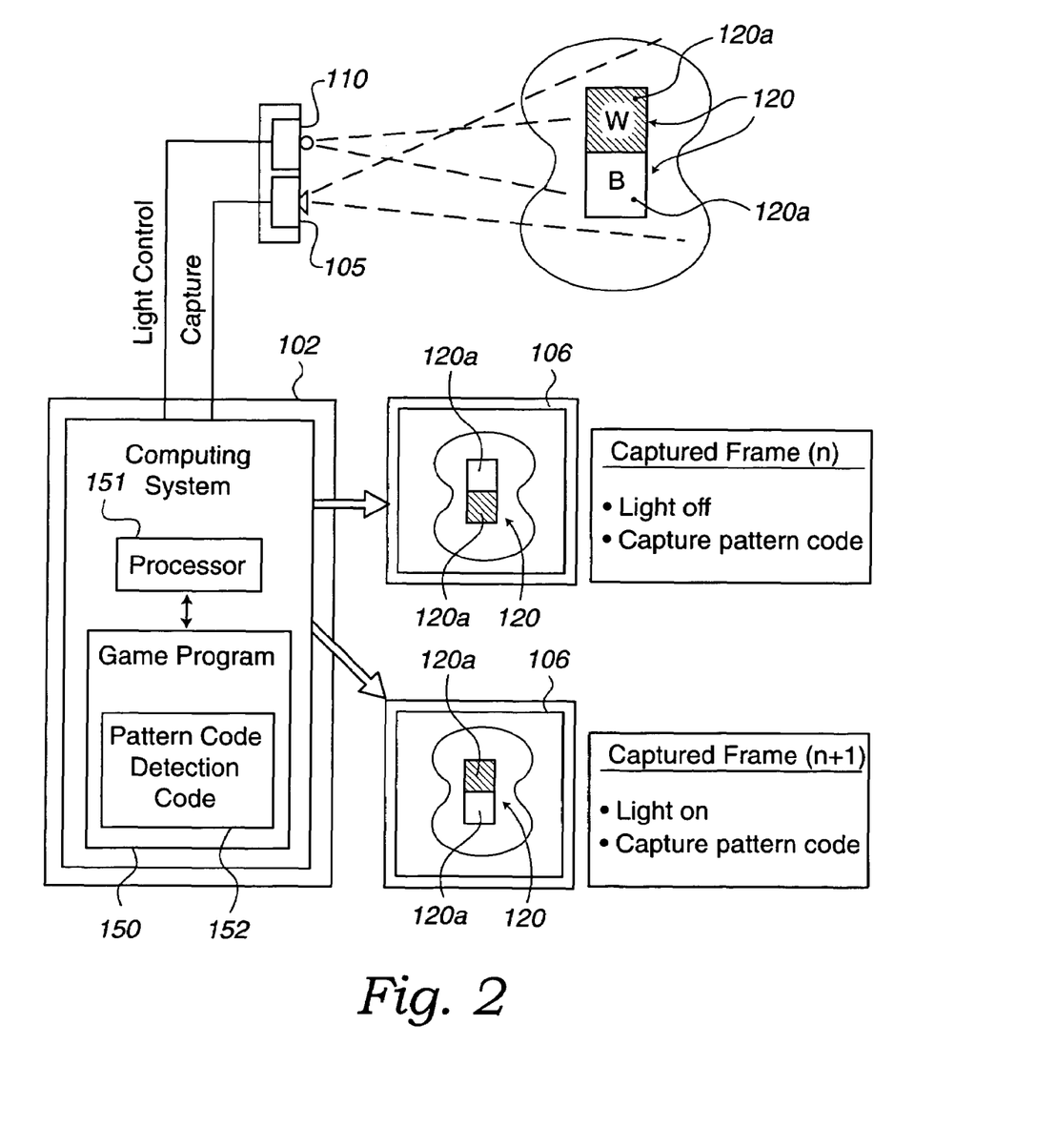
FIG. 2 illustrates a simplified version of the computing system which is executing a game program, in accordance with one embodiment of the present invention.

FIG. 2 illustrates a simplified version of the computing system 102 which includes a processor 151 and is executing a game program 150. The game program 150 is configured to include pattern code detection code 152. As shown, the computing system 102 is coupled to each of the video capture device 105 and the light application device 110. The video capture device 105 is coupled to the computing system 102 such that capture information is communicated to the computing system in one of digital form or analog form, depending on the particular system.

For instance, if the video capture device 105 is capable of digitizing the captured video, the captured information is communicated in digital form to the computing system 102. The digital form of the captured video may be in the form of a plurality of captured frames of video. The light application device 110 is coupled to the computing system 102 to provide light control. Light control will dictate when the light application device 110 will turn ON and OFF. The object having pattern code 120 is shown having tag codes 120a. One of the tag 120a is identified to be white "W", and the other tag 120a is identified to be black "B".

Thus, the visual representation of the tag codes 120a of the pattern code 120 will have a black and white representation when the light is OFF and only ambient light is present. Although the colors black and white are being used for discussion purposes, it should be understood that the colors can be varying colors of white and varying colors of black, and also the colors do not need to be black or white, but can be any color that can provide a contrast between adjacent colors.

In this example, the white tag code 120a is made from a material that is reflective. As mentioned above, the reflective material can be a type of cloth, or plastic-type material that is capable of reflecting light when light is applied to the surface of the material. These materials may reflect light in many directions when light is applied to the surface. However, when the light is OFF, the tag code 120a having the white surface, may look very similar to the surface of the material that is shown to be black. In display 106, the computing device 120 may generate a first frame (captured frame (n)), which is illustrated to have a captured image of the pattern code 120. The first frame was captured by the video capture device 105 when the light application device 110 was OFF. Thus, the video capture device 105 would have captured the frame where the top tag is light in color and the bottom tag is dark in color. In a next captured frame (n+1), the pattern code 120 will have a different state. The different state in the captured frame for the pattern code 120 is the result of having had the light application device 110 ON.

When the light application device 110 was ON, the top tag became illuminated to a bright state thus reflecting light. However, the bottom tag did not have the reflective material built into the tag portion, and therefore, the detected pattern code 120 will have the top tag brighter than the bottom tag. Consequently, the computing system 102 will capture the information from each of the captured frames and process the tag codes 120a of the pattern code 120 during each of the times when the light was OFF and the light was ON.

Although shown as two simple tags for illustration purposes, the pattern code 120 can have any number of tag codes 120a, and form different shapes, patterns and arrays. In addition, the computing system 102 may be programmed to capture any number of frames and compare the resulting pattern codes 120 captured as a result of the controlled application by the light application device 110, to the pattern code 120.

Figure 3A:
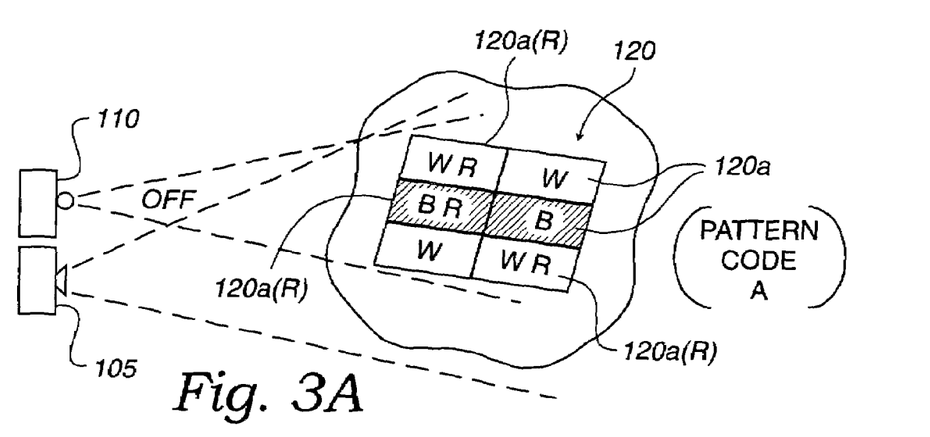
FIGS. 3A-3C illustrate examples of the pattern code, where some tags are reflective and some are not reflective, in accordance with one embodiment of the present invention.

FIG. 3A illustrates an example where the pattern code 120 has white and black materials that portray a pattern code A when the light application device 110 is OFF. The video capture device 105 will capture the image of the pattern code 120 to produce the pattern code A. As illustrated, the pattern code A will have two top tags 120a that are white, and two bottom tags 120a that are white, and a middle row of black tags 120a. In accordance with one embodiment, any number of the tags can be made from a reflective material. In this example, the top left white tag is reflective, the left black tag is reflective, and the bottom right white tag is reflective.

Figure 3B:
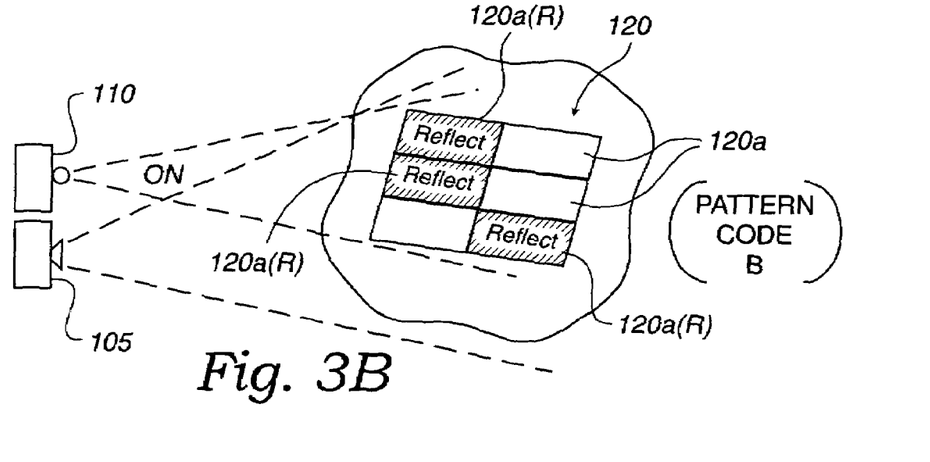
Figure 3C:
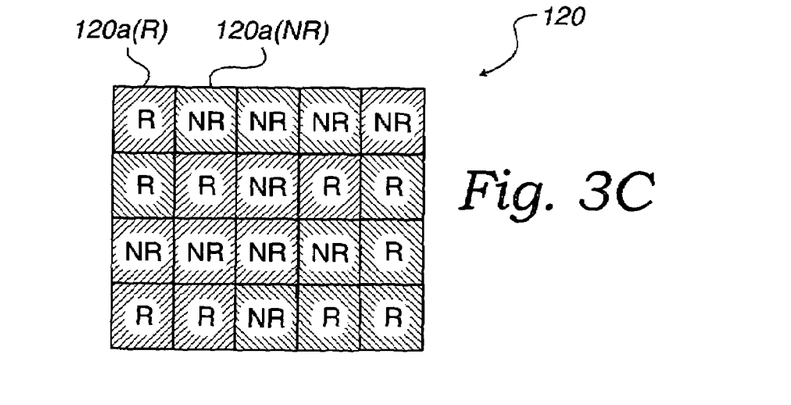

However, to the casual observer of the pattern code 120, the observer will only see the pattern code having the two black tags 120a in the middle row when the light is OFF. When the light is ON, as shown in FIG. 3B, the tags 120a that have the reflective material will be illuminated, thus producing a pattern code B. The pattern code B will thus be captured by the video capture device 105. From this example, it is evident that the pattern code A of FIG. 3A is different than the pattern code B of FIG. 3B. Thus, no matter what the color or shade of the individual tags 120a are, it is possible to make the different colors reflective or non-reflective, depending on the pattern that is desired when the light is ON as shown in FIG. 3B. FIG. 3C illustrates the example where different tags 120a are made to be reflective and non-reflective. Depending on where the reflective tags 120a (R) are placed in the pattern code 120, the reflective tags will cause a different pattern to be captured by the video capture device 104 when the light is ON.

In an aspect of the invention, it should be noted that the visual image when the light is ON can be subtracted from when the light is OFF, to see the difference between the two. By performing the subtraction, it is possible to make decoding of the images more robust. In this aspect of the invention, the robustness is believed due to the fact that it is easier to see how light changes, rather than comparing the image to an absolute image of what is expected (which could vary due to lighting conditions, etc). Thus, the change due to the light should be quite insensitive to other visual disturbances.

Figure 4A:
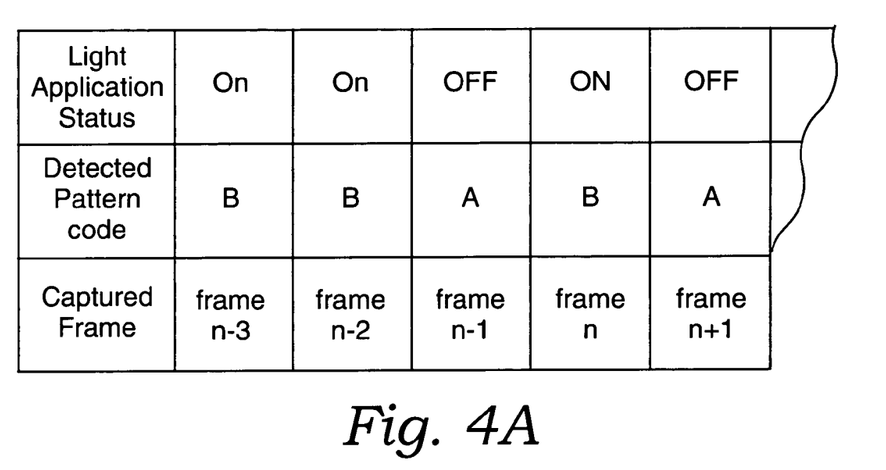
FIGS. 4A and 4B illustrate examples of how the time intervals can be set for applying light and capturing pattern code characteristics, in accordance with one embodiment of the present invention.

FIG. 4A illustrates a table of the light application status and comparing the detected pattern code for pattern codes being analyzed, and each captured frame. In frame (n–3), the light application status is ON, and the detected pattern code is B. In frame (n–2), the light application status is ON, and the detected pattern code is B. In frame (n–1), the light application status is OFF, and the detected pattern code is A. In frame (n), the light application status is ON, and the detected pattern code is B. And in the frame (n+1), the light application status is OFF, and the detected pattern code is A. Thus, the computing system 102 can determine when the light application status will be ON and OFF, and the frequency at which it is turned ON and OFF, or the number of frames it is left ON or OFF. In this example, five frames were analyzed to determine when the light application status was ON and OFF, and the resulting detected pattern code is produced. The detected pattern code for the five frames that were captured and decoded would be "B B A B A".

Figure 4B:
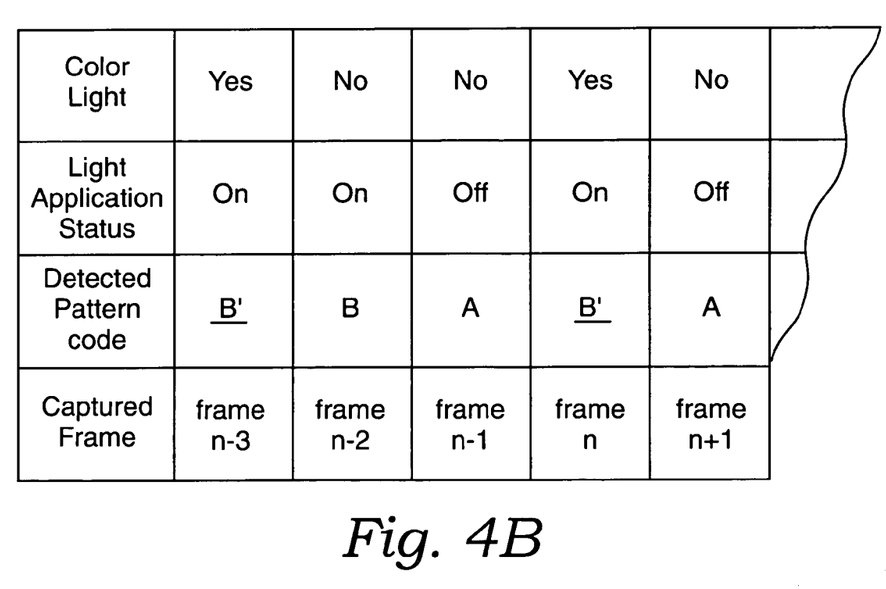

FIG. 4B illustrates a special case where color light is applied by the light application device. The color light may be in addition to a plain white light (e.g., similar to light emitted by a flash light). In another embodiment, the color light may be the light applied by a red LED, or a different colored lens that would apply a different color to the pattern code. In FIG. 4B, during the light application status for frames (n−3) and (n), a color light is applied to the pattern code. In this situation, the color light is different than the light that was applied when the light application status was ON in FIG. 4A.

For instance, the light may have been a white light in FIG. 4A, or the light may have been a red light in FIG. 4A. But in FIG. 4B, the color light is a light other than the light that was being applied in FIG. 4A. In such a scenario, the detected pattern code would be slightly different (i.e., B') for frames (n−3) and (n), as compared to frame (n−2). Thus, it is possible to not only detect whether light is ON, but also detect different shades of color that can be reflected and contrasted on the pattern code that is being analyzed. Thus, a tag can take on more that two states. The number of states that a tag can take on is dependent on whether the light is ON or OFF, but also on the colors used. Still further, an embodiment of the present invention can include having multiple light sources, and each light source can produce a different color shade. Each light source can thus be turned ON or OFF in accordance with its own coding and decoding scheme.

Figure 5A:
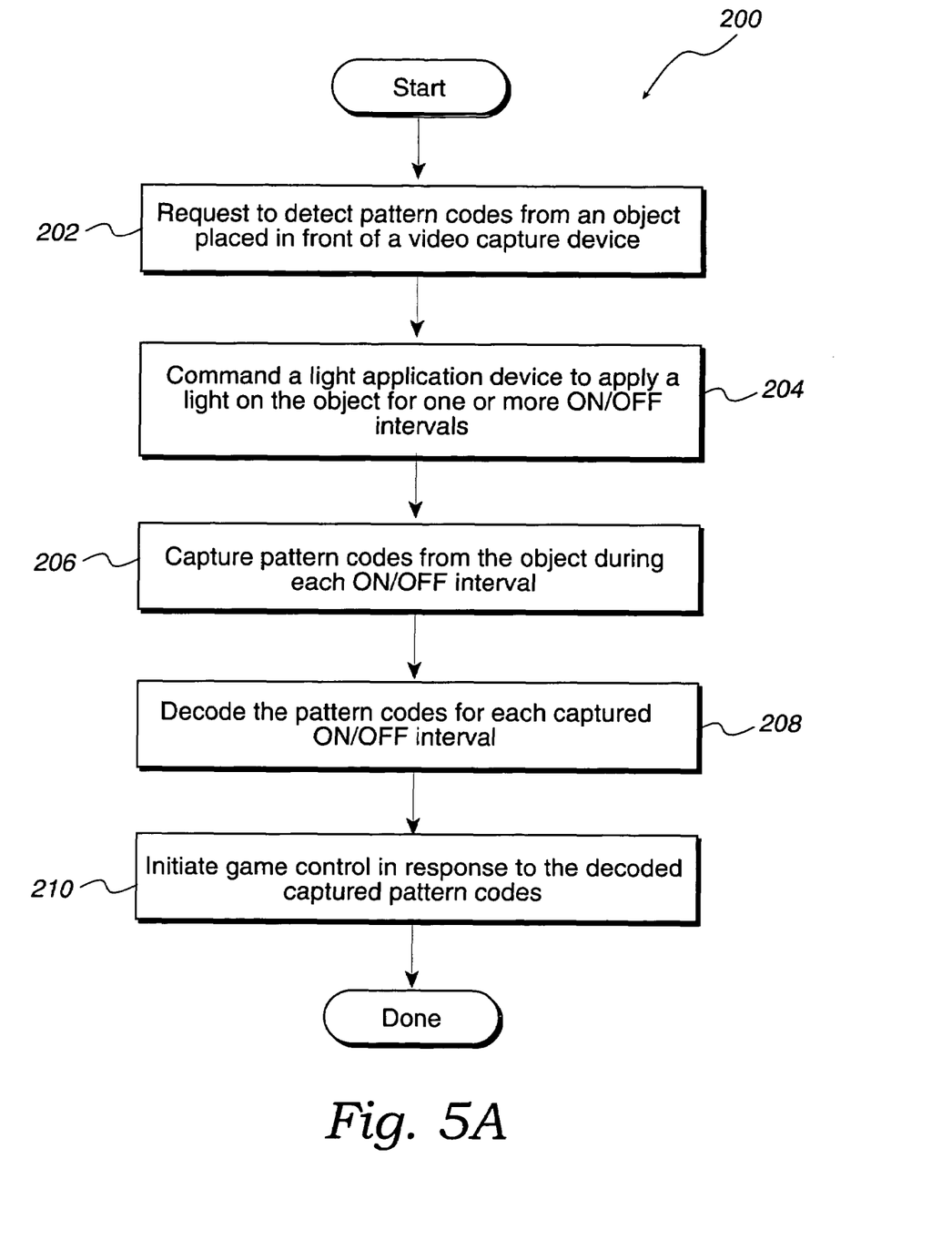
FIG. 5A illustrates a flowchart diagram of a method for using a pattern code to control activity in a video game, in accordance with one embodiment of the present invention.

FIG. 5A illustrates a flowchart diagram of a method for using a pattern code to control activity in a video game. The method begins at operation 202 where a request is made to detect pattern codes from an object placed in front of a video capture device. The request may be made by the software that is executing in the computing system, such as the software that is part of a video game. In operation 204, the light application device would receive a command from the software to apply a light on the object for one or more ON and OFF intervals. In another embodiment, the intervals may be multiple ON's followed by multiples OFF's or any combination of ON/OFF, to define specific ON/OFF intervals.

The method now moves to operation 206 where pattern codes are captured from the object during each of the ON and OFF intervals. The captured pattern codes are then detected in operation 208 for each of the captured ON and OFF intervals. Based on the decoded information obtained from the pattern codes with respect to the ON and OFF intervals, the software of the video game can cause an initiation in game control in response to the decoded captured pattern codes. The initiation of game control may be in the form of providing special interactive features to the game, or enabling special features of the game, or unlocking advanced features that can only be unlocked when the user provides the pattern code that can be detected by the capture-device.

Figure 5B:
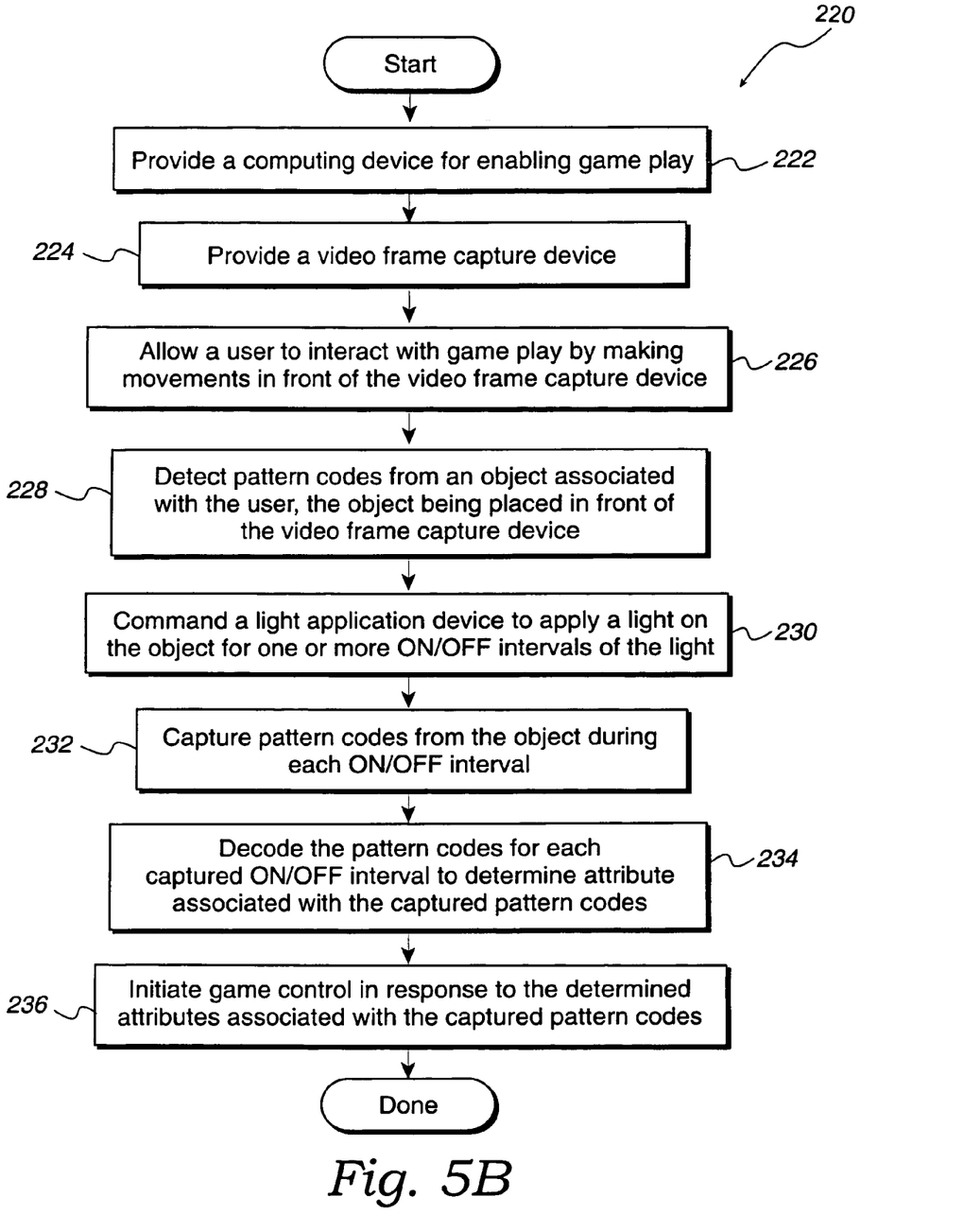
FIG. 5B illustrates a flowchart diagram of the processing and inter-activity with a pattern code that may be used in a video game environment, in accordance with one embodiment of the present invention.

FIG. 5B illustrates a flowchart diagram 220 of the processing and inter-activity with a pattern code that may be used in a video game environment. In operation 222, a computing device is provided for enabling a game play. The computing device can be in the form of a general computer, or a specialized computing system such as a game console (e.g., the Sony Playstation 2). The method then moves to operation 224 where a video frame capture device is provided. The video frame capture device can be connected to the computing device to enable the captured frames to be processed by the computing device.

The method then moves to operation 226 where a user is allowed to interact with game play by making movements in front of the video capture device. Examples of the movement have been described with reference to FIGS. 1A and 1C. In operation 228, pattern codes are detected from an object that is associated with the user. The object should be placed in front of the video capture device to enable it to detect the pattern codes. The times at which the pattern codes are detected are set by the computer code that would be running and associated with the game play. At particular times which are set by the game processing logic, a command is sent to the light application device to apply light to the object for one or more ON/OFF intervals of the light in operation 230.

The video frame capture device would then capture the pattern codes from the object during each of the ON and OFF intervals in operation 232. The pattern codes are then decoded for each of the captured ON and OFF intervals to determine attributes associated with the captured pattern codes in operation 234. Depending upon the decoded pattern code, the video game will either provide or not provide special powers or special interactivity to the user during game play. In operation 236, game control may be initiated in response to the determined attributes associated with the captured pattern codes. Initiating game control should be broadly understood to be any kind of control or attribute that is enabled or disabled in view of the pattern code that was detected and used by the user during game play.

As described herein, embodiments of the invention have been defined with reference to a game program. However, it should be understood that the pattern codes can be used in any number of applications outside of game programs. The pattern codes, for instance, can be used in situations where hard-to-fake pattern encoding and decoding is needed. In some instances, it can be used to track merchandise, track vehicles, track objects in transit, track inventory of goods, track people that enter a restricted place or have authority to enter certain area, or to identify persons that have access to certain programs or services. In one example, a user having the pattern codes, e.g., either wearing or displaying, can access services provided by a walk-up kiosk or the like. Accordingly, the coding and decoding of pattern codes should be viewed broadly, and should not be restricted to game programs.

In addition, the pattern codes can be encoded with data, and the decoding can be configured to read and understand the data stored on the pattern codes. The reading of the pattern codes, as noted above, can occur during times when the light is ON, OFF, or when the light is ON in different colors. The pattern codes can also store a serial number, data, or any type of identification data. Such serial number, data, or identification information can then be used by a computer to initiate or execute task or program, and generate a result.

Still further, in addition to being a hard to fake pattern code, the pattern code is also a reliable way to encode more data into the same area. In the special case of a binary situation, as used in two dimensional matrix-style barcodes, a given area could encode 2 bits rather than just 1 bit. In effect, the pattern codes would present 2 independent barcodes, and could be decoded exactly in that way, using a two dimensional matrix-style barcode decoder methodology, but with an extension. For instance, a process could involve performing a traditional image decode with the light OFF, which generates first decoded data. A second process could include decoding with the light OFF, and then decoding with the light ON, and then taking the different. The difference would then represent second decoded data. As noted above, this technique can provide a more robust decoding methodology, as light disturbances would be less likely to affect the result obtained by the subtraction process.

Still further, a pattern code can take on any particular shape. The spaces illustrated here are only exemplary. For instance, the pattern codes that are arranged in a row and column array do not need to be symmetric, and each tag of the pattern code can be made larger or smaller depending on the media onto which it is to be applied. Also, the tags can be joined to form geometric shapes, such that the pattern code includes only different shapes, or the shapes can be mixed with individual square shapes.

It should be appreciated that the embodiments described herein may also apply to on-line gaming applications. That is, the embodiments described above may occur at a server that sends a video signal to multiple users over a distributed network, such as the Internet, to enable players at remote noisy locations to communicate with each other. It should be further appreciated that the embodiments described herein may be implemented through either a hardware or a software implementation. That is, the functional descriptions discussed above may be synthesized to define a microchip having logic configured to perform the functional tasks for each of the modules associated with the noise cancellation scheme.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system, including an electromagnetic wave carrier. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for interacting with a computer game, comprising:
    presenting a pattern code defined by at least two tags, each of the at least two tags being oriented to face a detectable direction;
    applying a light toward the pattern code at a specific time;
    capturing a first video frame of the pattern code before the light is applied to the pattern code in the detectable direction, the first video frame defining a first characteristic of the pattern code;
    capturing a second video frame of the pattern code when the light is applied to the pattern code, the second video frame defining a second characteristic of the pattern code;
    decoding the first characteristic and the second characteristic of the pattern code to produce decoded information, the first characteristic is different than the second characteristic, the first and second characteristic each define a code state of the pattern code before light is applied and when light is applied toward the detectable direction of the pattern code; and
    initiating an interactive command to the computer game, a type of the interactive command defined by the decoded information;
    wherein one of the tags has a reflective surface and one of the tags has a non-reflective surface, such that the second characteristic of the pattern coded has more illumination coming from the reflective surface while less coming from the non-reflective surface, thus defining the pattern code from the at least two tags.

2. The method for interacting with a computer game as recited in claim 1, wherein each of the two tags is capable of having a specific color.

3. A system for interfacing with a computer game, comprising:
    a pattern code defined by a first and second tag which are both oriented to face in one direction;
    a light application device;
    a video capture device;
    a processor, the processor being capable of executing game instructions, executing control instructions for interfacing with the light application device, and executing instructions for capturing video from the video capture device, the light application device being configured to apply light at both of the first and second tags of the pattern code and the execution of the control instructions for the light application device determining when to apply the light, the light being applied at both of the first and second tags of the pattern code defining a first pattern configuration when light is applied and a second pattern configuration that is different than the first pattern configuration when the light is not applied, and the execution of the instructions for capturing video being capable of identifying the first pattern configuration and the second pattern configuration to enable the processor to decode the first pattern configuration and the second pattern configuration to define an interactive instruction for the computer game, such that one of the tags has a reflective surface and one of the tags has a non-reflective surface, and the first pattern configuration has more illumination defined from the reflective surface and less illumination from the non-reflective surface, thus defining the decode to define the interactive instruction for the computer game;
    wherein the first and second characteristic each define a code state of the pattern code before and after light is applied onto the pattern code that is in the one direction.

4. The system for interfacing with a computer game as recited in claim 3, wherein the interactive instruction defining an input that is enabled in response to the decoded first pattern configuration and the second pattern configuration.

5. The system for interfacing with a computer game as recited in claim 3, wherein the first pattern configuration that is defined when light is applied to the pattern code is visually defined by at least one portion of the pattern code defined by a tag being light reflective.

6. The system for interfacing with a computer game as recited in claim 3, wherein the second pattern configuration that is define when the light is not applied to the pattern code is visually defined by characteristics of each portion of the tags of the pattern code.

7. The system for interfacing with a computer game as recited in claim 3, wherein the characteristics of each tag is defined by color.

8. The system for interfacing with a computer game as recited in claim 3, further comprising:
a display.

9. The system for interfacing with a computer game as recited in claim 8, wherein the display is capable of illustrating a translucent version of a player to enable interactivity with graphical objects of the computer game.

10. A computer program embodied on a computer readable medium for interacting with a computer game, the computer program comprising:
presenting a pattern code defined by at least two tags which are both oriented to face one direction;
program instructions for applying a light toward the pattern code at a specific time;
program instructions for capturing a first video frame of the pattern code before the light is applied to the pattern code, the first video frame defining a first characteristic of the pattern code;
program instructions for capturing a second video frame of the pattern code when the light is applied to the pattern code, the second video frame defining a second characteristic of the pattern code;
program instructions for decoding the first characteristic and the second characteristic of the pattern code to produce decoded information, the first characteristic is different than the second characteristic, wherein the first and second characteristic each define a code state of the pattern code before and after the light is applied onto the pattern code; and
program instructions for initiating an interactive command to the computer game, a type of the interactive command defined by the decoded information, wherein one of the tags has a reflective surface and one of the tags has a non-reflective surface, such that the second characteristic of the pattern coded has more illumination coming from the reflective surface while less coming from the non-reflective surface, thus defining the pattern code from the at least two tags.

11. The computer program embodied on a computer readable medium for interacting with a computer game 10, wherein each of the two tags is capable of having a specific color.

12. A system for interfacing with a program of a computer system, comprising:
a pattern code defined by at least two tags oriented to face in one direction;
a light application device;
a video capture device;
a processor, the processor being capable of executing instructions, executing control instructions for interfacing with the light application device, and executing instructions for capturing video from the video capture device, the light application device being configured to apply light at the pattern code and the execution of the control instructions for the light application device determining when to apply the light, the light being applied at the pattern code defining a first pattern configuration when light is applied and a second pattern configuration that is different than the first pattern configuration when the light is not applied, and the execution of the instructions for capturing video being capable of identifying the first pattern configuration and the second pattern configuration to enable the processor to decode the first pattern configuration and the second pattern configuration to define an instruction for the program of the computer system, the first and second characteristic each defining a code state of the pattern code before and after the light is applied onto the pattern code, such that one of the tags has a reflective surface and one of the tags has a non-reflective surface, and the first pattern configuration has more illumination defined from the reflective surface and less illumination from the non-reflective surface, thus defining the decode to define the instruction for the program of the computer system.

13. The system for interfacing with a program of a computer system as recited in claim 12, wherein the instruction defining an input that is enabled in response to the decoded first pattern configuration and the second pattern configuration.

14. The system for interfacing with a program of a computer system as recited in claim 12, wherein the first pattern configuration that is defined when light is applied to the pattern code is visually defined by at least one tag of the pattern code being light reflective.

15. The system for interfacing with a program of a computer system as recited in claim 12, wherein the second pattern configuration that is define when the light is not applied to the pattern code is visually defined by characteristics of each tag of the pattern code.

16. The system for interfacing with a program of a computer system as recited in claim 12, wherein the characteristics of each portion is defined by color.

17. A method for interacting with a computing device, comprising:
presenting a pattern code defined by at least two tags oriented to face one direction;
applying a light toward the pattern code at a specific time, as the pattern code faces the one direction that is exposed to the light;
capturing a first video frame of the pattern code before the light is applied to the pattern code, the first video frame defining a first characteristic of the pattern code;
capturing a second video frame of the pattern code when the light is applied to the pattern code, the second video frame defining a second characteristic of the pattern code;
decoding the first characteristic and the second characteristic of the pattern code to produce decoded information, the first characteristic being different than the second characteristic, and the first and second characteristic each defining a code state of the pattern code before and after the light is applied onto the pattern code; and
initiating an interactive command to the computing device, a type of the interactive command defined by the decoded information, such that one of the tags has a reflective surface and one of the tags has a non-reflective surface, and the first pattern configuration has more illumination defined from the reflective surface and less illumination from the non-reflective surface, thus defining the decoded information to define the interactive command.

* * * * *